United States Patent [19]

Andersson

[11] 4,270,422
[45] Jun. 2, 1981

[54] CUTTING TOOL

[75] Inventor: Ken G. E. Andersson, Årsunda, Sweden

[73] Assignee: Sandvik Aktiebolag, Sandviken, Sweden

[21] Appl. No.: 76,860

[22] Filed: Sep. 19, 1979

[30] Foreign Application Priority Data

Sep. 26, 1978 [SE] Sweden ................. 7810060

[51] Int. Cl.³ ............................ B23B 29/12
[52] U.S. Cl. ...................... 82/36 R; 82/36 B;
407/101; 407/112; 408/198; 408/232
[58] Field of Search ............. 82/36 R, 36 B, 36 A,
82/37; 407/46, 101, 112; 408/198, 232

[56] References Cited

U.S. PATENT DOCUMENTS

| 862,809 | 8/1907 | Conklin | 407/112 |
|---|---|---|---|
| 2,277,290 | 3/1942 | Bennett | 407/101 |
| 2,908,194 | 10/1959 | Lynn | 82/36 B |
| 3,491,629 | 1/1970 | Braasch | 82/37 |

FOREIGN PATENT DOCUMENTS 922146  3/1963  United Kingdom ............. 82/36 R

Primary Examiner—Leonidas Vlachos
Attorney, Agent, or Firm—Burns, Doane, Swecker & Mathis

[57] ABSTRACT

A tool element (10) provided with a cutting insert (11) is readily attachable to and detachable from an elongated holder body (12), which is secured to a machining tool. The tool element (10) is clamped against the holder body (12) by means of a bar (19) which is longitudinally movable in the holder body. In order to prevent the cutting forces from causing a relative movement between the tool element (10) and the holder body (12) projections (23, 24) on the tool element (10) are forced against opposed abutting surfaces (16, 17) on the holder body (12) by means of complementary cam surfaces on an enlarged portion (21) on the bar and on the projections (23, 24) upon a clamping movement of the bar (19).

10 Claims, 11 Drawing Figures

CUTTING TOOL

The invention relates to a cutting tool comprising an elongated holder body in which a bar is movable for clamping a tool element against the holder body. The tool element is provided with a cutting means.

When machining work-pieces in lathes tool holders are usually used which comprise an elongated shaft having a generally rectangular or round cross section. A cutting insert is mounted on the tool holder at the one end thereof. The shaft is secured to the lathe, usually by means of two or three screws.

In machines using this previously known type of tool holder the latter has to be replaced by another holder when the type of cutting inserts is exchanged, which results in high handling costs. Besides the elongated shaft requires a lot of room, which causes problems to the machine designer. Further, this technique is difficult to apply in a mechanized exchange of tools.

In order to overcome the above problems it has been suggested in Swedish patent publication No. 401 469 to mount the cutting insert on a separate tool element which can be clamped against the main body of the tool holder by means of a drawbar.

In this prior art design a shaft on the tool element projects into a recess in the forward end of the drawbar. The shaft is provided with a cam surface on its one side adapted for cooperation with a complementary cam surface in the recess. During clamping of the tool element a relative movement along the cam surfaces causes the shaft to be moved in the lateral direction until it abuts a supporting surface in the recess opposite to the cam surface therein. Due to the high cutting forces acting on the tool element during the working operation it has been found that this connection between the tool element and the holder body is not rigid enough.

The object of the present invention is to improve the cutting tool of the type shown in the Swedish patent publication No. 401 469 so that a satisfactory rigidity is obtained. Thus, the present invention seeks to improve the accuracy of the positioning of the cutting insert.

Another object of the invention is to provide a quick and firm clamping of tool elements of left-hand as well as right-hand designs in the same holder body.

A further object of the invention is to provide good possibilities for mechanization so that a completely automatic exchange of tool elements in the machine can be achieved.

The above and other objects of the invention are attained by the characterizing features stated in the appending claims.

The invention is described in detail in the following description with reference to the accompanying drawings in which three embodiments are shown by way of example. It is to be understood that these embodiments are only illustrative of the invention and that various modifications thereof may be made within the scope of the claims.

In the drawings.

Corresponding details in the various figures have been given the same reference numerals.

Figure 1:
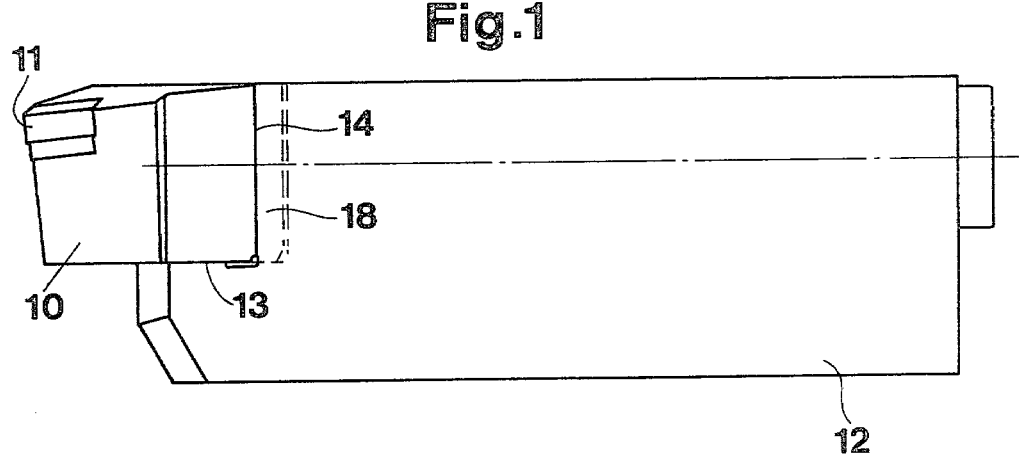
FIG. 1 shows a side view of one embodiment according to the invention, wherein the cutting tool is shown in a right-hand turning version.
Figure 2:
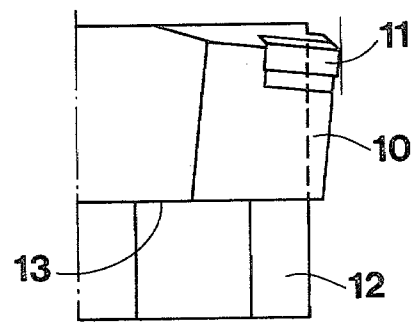
FIG. 2 shows a front view of the cutting tool in FIG. 1.
Figure 3:
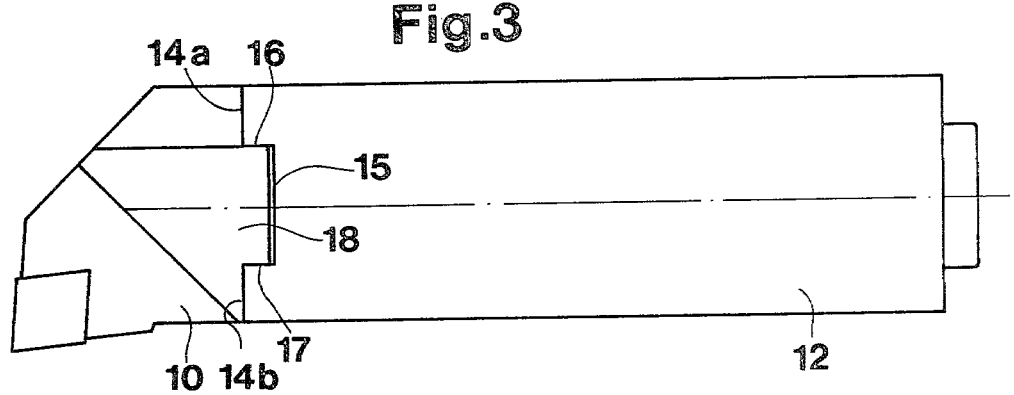
FIG. 3 shows a top view of the cutting tool in FIGS. 1 and 2.
Figure 4:
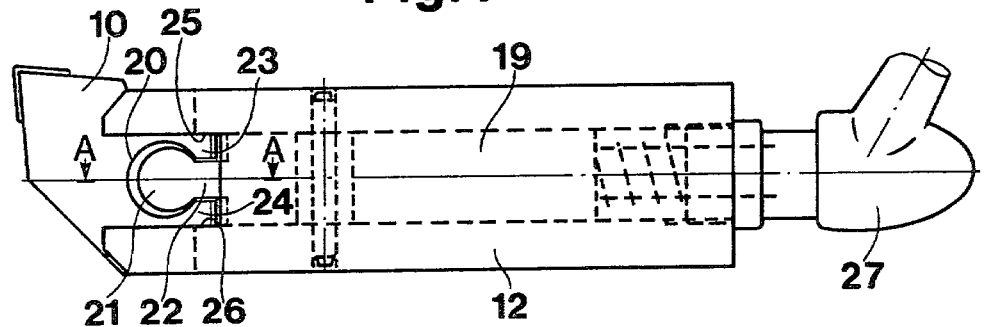
FIG. 4 shows a bottom view of the cutting tool in FIGS. 1-3.
Figure 5:
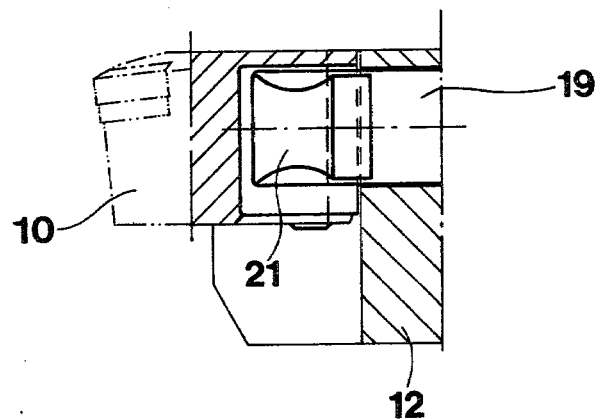
FIG. 5 shows a section taken on the line A—A in FIG. 4.

The cutting tool shown in FIGS. 1-5 comprises a tool element 10 provided with a cutting means in form of a cutting insert 11. The planar outer surface of the cutting insert 11 is disposed in substantially the same plane as the top surface of the tool element 10. The tool element 10 is attached to an elongated shaft 12 at the outer end thereof; the shaft 12 providing the main body of a tool holder. The shaft 12 has a rectangular cross section and is adapted to be secured to a lathe in conventional manner.

In its clamped position against the forward end of the holder body 12 the tool element 10 is forced against a supporting surface 13 and an supporting end surface 14 perpendicular thereto on the holder body. The supporting end surface 14 is broken by a recess 15, which extends axially inwardly into the shaft 12. The axial supporting surface of the tool element 10, thus, is formed by two surfaces 14a, 14b lying in the same transversal plane. The recess 15 is bounded laterally by opposed planar abutting surfaces 16, 17, which extend in the longitudinal direction of the holder body 12 in mutual parallelism. The recess 15 is intended to receive a correspondingly shaped shaft portion 18 on the tool element 10.

For clamping the tool element 10 there is provided a drawbar 19 which is longitudinally movable in the holder body 12. The forward portion 21 of the bar 19 is received in a correspondingly shaped groove 20 in the tool element 10.

In the illustrated embodiment the portion 21 is designed as a cylindrically rounded enlargement, which is connected to the main body of the shaft 12 over a narrowed cylindrical neck portion 22. The groove 20, which is designed for locking interrelationship with the bar 19 has a corresponding cylindrical shape; it has, however, a somewhat larger cross section area than the enlarged portion 21. The opening of the groove 20 is narrowed by means of projections 23, 24 which project into the groove from both sides thereof. The projections 23, 24 define the axial inward termination of the tool element 10 and are provided with outer planar and mutual parallel side faces 25, 26. In the clamped position of the tool element 10 the side faces 25, 26 rest against the abutting surfaces 16, 17 in the recess 15. The groove 20 terminates at the underneath side of the tool element 10, while its upward extent is limited by the planar top surface of the tool element 10. Due to this design problems caused by accumulation of chips in the joint are eliminated. Such accumulation would decrease the life of the joint and deteriorate its ready disassembling during exchange of the tool element.

When the tool element 10 is to be clamped against the holder body 12 the tool element is first pushed thereagainst so that its bottom surface rests against the supporting surface 13 and its rear end surface rests against the supporting end surfaces 14a, 14b. The enlarged portion 21 of the bar 19 is then received in the groove 20, while the shaft portion 18 of the tool element 10 is received in the recess 15. During tightening of the bar 19 by means of a suitable operating means, such as a member 17 rotatably screwed to the bar, the tool element 10 is forced against the end surfaces 14a, b. When the bar 19 is further tightened the projections 23, 24 are caused to expand in opposite directions in the transversal direction of the holder body 12. The expansion of the projections 23, 24 is caused due to complementary cam surfaces on the portion 21 adjacent to the neck portion 22 and on the projections 23, 24, see FIG. 4. Upon a slight expansion of the projections 23, 24, the latter are forced against the abutting surfaces 16, 17. Thus, a high compression force is applied on both side faces 25, 26 of the shaft portion 18, thereby ensuring that the joint members have no play between them. In order to adapt the design of the tool element to an automatized handling thereof the recess 15 for the tool element 10 is symmetrical with respect to a vertical plane through the axial centre line of the holder body 12. Tool elements 10, thus, of left-hand as well as right-hand design can be mounted in the same holder body 12.

In the illustrated embodiment the enlarged portion 21 of the bar 19 is cylindrically rounded. It is to be understood, however, that various modifications of this portion can be made. For instance, the widened portion can be dove-tailed and the groove 20 given a corresponding shape.

Figure 6:
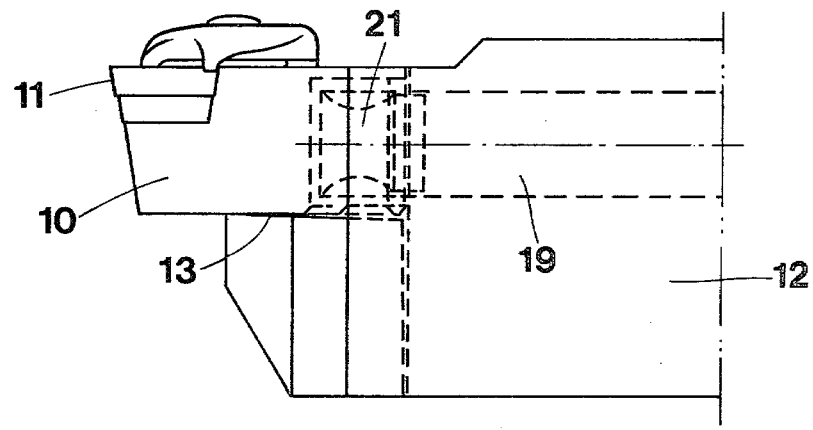
FIGS. 6 and 7 show a side view and a top view, respectively, of an alternative embodiment according to the invention.
Figure 7:
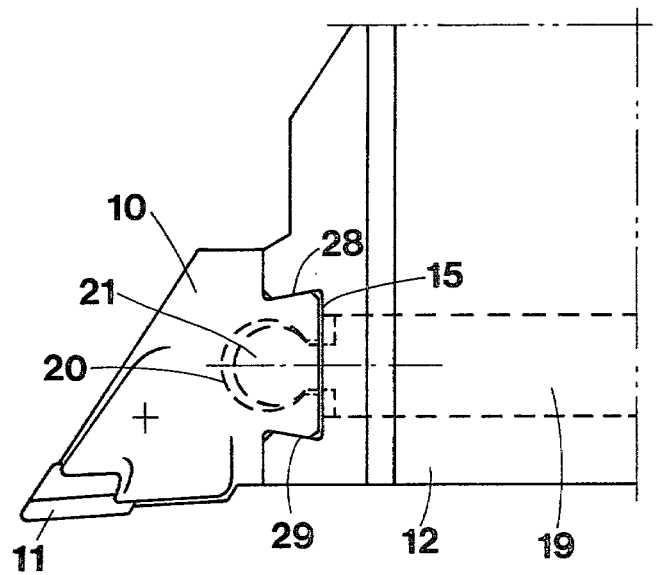

In FIGS. 6 and 7 an alternative embodiment of the invention is shown, wherein the shaft portion 18 of the tool element 10 and the front end of the holder body 12 are interconnected by means of a dove-tail joint. Thus, the mouth of the recess 15, which receives the shaft portion 18, is narrowed by means of mutually opposed wedge surfaces 28, 29 adapted for cooperation with complementary supporting surfaces on the shaft portion 18. The design of the drawbar 19 and the groove 20, which receives the enlarged portion 21 of the bar 19, is the same as that shown in FIGS. 1-5. Alternatively, however, as above-mentioned also the connection between the drawbar 19 and the groove 20 can be made as a dove-tail joint.

Figure 8:
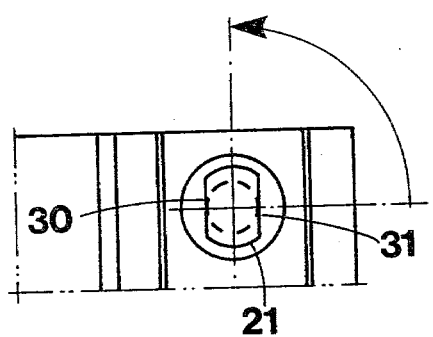
FIG. 8 shows a top view of the forward portion of the holder body according to a further embodiment of the invention and a sectional view FIG. 8 B—B taken on the line B—B; the tool element being detached.
Figure 8:
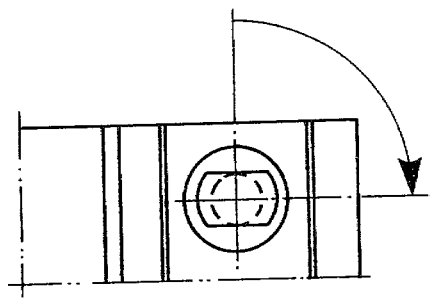
Figure 8:
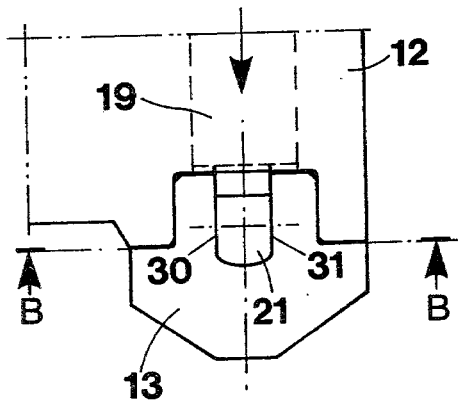
Figure 9:
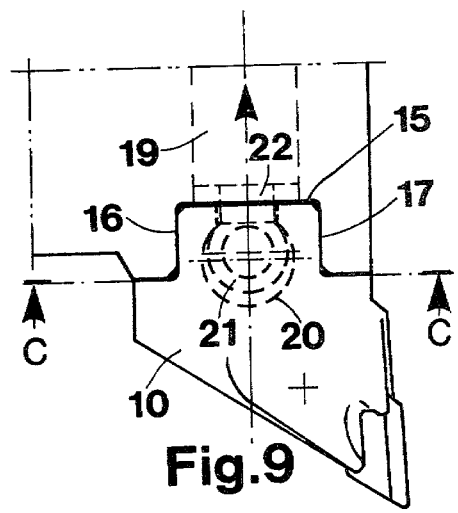
FIG. 9 shows a top view and a sectional view FIG. 9 B—B taken on the line C—C of the holder body in FIG. 9; the tool element being attached.

In FIGS. 8, 9 a further embodiment according to the invention is shown having a modified connection between the holder body 12 and the tool element 10. In similarity with the embodiment according to FIGS. 1-5 the side faces on the shaft portion 18 of the tool element are planar and parallel with the abutting surfaces 16, 17 in the recess 15. The end portion 21 of the drawbar, however, has the shape of a flattened cylindrical enlargement having two parallel and oppositely directed planar surfaces 30, 31. The distance between the surfaces 30, 31 corresponds to the diameter of the neck portion 22 on the drawbar, which neck portion interconnects the enlargement 21 and the main body of the drawbar 19.

According to this embodiment the drawbar 19 is not tightened until the tool element 10 is placed in its position and the drawbar then is rotated 90° from the releasing position shown in FIG. 8 and FIG. 8 B—B to the locking position shown in FIG. 9 and FIG. 8 B—B. Such a design allows insertion of the tool element 10 into the recess 15 in the holder body 12 either straight from above or straight from in front. The latter insertion technique is desired in a mechanized exchange of the tool element.

I claim:

1. A cutting tool comprising an elongated holder body, and a bar movable in the holder body for clamping a tool element against the holder body, said tool element being provided with a cutting means, characterized in that the tool element is provided with a groove, the opening of said groove facing the bar, said tool element having projections at said opening into said groove from both sides thereof so as to provide the opening with a restricted cross section area, and that the bar is provided with an enlarged portion adjacent to the tool element, said groove being adapted to receive said enlarged portion, said enlarged portion and projections having complementary cam surfaces so that when pulling by means of the bar the tool element against at least one end surface on the holder body the projections are caused to expand in opposite directions, thereby forcing the projections against opposed abutting surfaces on the holder body.

2. A cutting tool according to claim 1, wherein the groove comprises a cylindrical widened portion and the enlarged end portion of the bar is substantially correspondingly cylindrical, said enlarged cylindrical portion being connected to the main body of the bar over a narrowed neck portion.

3. A cutting tool according to claim 2, wherein the cylindrical end portion of the bar is flattened and provided with two parallel and oppositely directed planar surfaces, the distance between said planar surfaces being substantially equal with the diameter of the neck portion of the bar, and wherein the bar is rotatable about ninety degrees between a releasing position and a locking position for releasing and locking, respectively, the tool element.

4. A cutting tool according to claim 1, wherein the groove in the tool element terminates at the underneath side thereof, and is closed in the upward direction by the top surface of the tool element.

5. A cutting tool according to claim 1, wherein the holder body is provided with a recess at its forward end adjacent to the tool element, said recess being designed to receive a shaft portion of the tool element.

6. A cutting tool according to claim 5, wherein the recess is symmetrically designed with respect to a vertical symmetry plane through the holder body.

7. A cutting tool according to claim 5 or 6, wherein the at least one end surface on the holder body comprises two supporting surfaces lying in the same transversal plane, the recess is located between said supporting surfaces, and the holder body is provided with a further supporting surface for supporting the underneath side portion of the tool element surrounding the termination of the groove.

8. A cutting tool according to claim 5, wherein side faces of the shaft portion of the tool element and the side faces of the recess are planar and parallel and run in the longitudinal direction of the holder body, said side faces providing the opposed abutting surfaces.

9. A cutting tool according to claim 8, wherein the cooperating contact surfaces on the shaft portion of the tool element and on the holder body are inclined with respect to the longitudinal direction of the holder body for providing a dove-tail joint.

10. A cutting tool according to claim 1, wherein the connection between the enlarged portion on the bar and the groove in the tool element is made in form of a dove-tail joint.

* * * * *